United States Patent [19]

Sato

[11] Patent Number: 5,374,467
[45] Date of Patent: Dec. 20, 1994

[54] LAMINATED FILM

[75] Inventor: Yoshinori Sato, Kanagawa, Japan

[73] Assignee: Diafoil Hoechst Company, Limited, Tokyo, Japan

[21] Appl. No.: 46,733

[22] Filed: Apr. 16, 1993

[30] Foreign Application Priority Data

Apr. 28, 1992 [JP] Japan .................................. 4-110247

[51] Int. Cl.$^5$ ............................ B32B 5/16; B32B 3/20
[52] U.S. Cl. ..................................... 428/143; 428/156; 428/172; 428/148; 428/212; 428/213; 428/215; 428/219; 428/220; 428/323; 428/340; 428/402; 428/409; 428/480; 428/903.3; 428/910; 264/176.1; 264/177.17; 264/177.2; 264/211.12; 264/288.4
[58] Field of Search ................ 428/156, 172, 143, 402, 428/148, 206, 212, 213, 215, 219, 220, 323, 336, 340, 402, 409, 480, 900, 903.3, 910; 264/112, 177.17, 177.1, 177.2, 176.1, 211.12, 241, 288.4, 560, 540

[56] References Cited

U.S. PATENT DOCUMENTS 4,568,616 2/1986 Seifried et al. ...................... 428/480
4,615,939 10/1986 Corsi et al. ........................... 428/323

FOREIGN PATENT DOCUMENTS 0522412 1/1983 European Pat. Off. .

OTHER PUBLICATIONS

Japanese Patent Abstract JP 84-052161 (Dec. 1984).
Patent Abstract, Derwent Publications Ltd., No. JP 3 292 141 (Dec. 1991).
Patent Abstract, Derwent Publications Ltd., No. 89-293 002 (Aug. 1989).
Patent Abstract, Derwent Publications Ltd., No. 89-273 932 (Aug. 1989).

Primary Examiner—Donald J. Loney
Attorney, Agent, or Firm—Foley & Lardner

[57] ABSTRACT

A laminated polyester film having a first polyester layer B and a second polyester layer A which is laminated on at least one surface of the polyester layer B and contains 0.05 to 10% by weight of particles having an average particle size of 0.005 to 1.0 μm based on the weight of the polyester layer A, in which a ratio of a thickness of the polyester layer A to a particle size of particles contained in the polyester layer B is from 0.5 to 10, the numbers of protrusions on a surface of the polyester layer A which give second order interference fringes, third order interference fringes and fourth or higher order interference fringes in a multiple beam interference method using light having a wavelength of 540 nm are from 5 to 60/mm$^2$, not larger than 20/mm$^2$ and not larger than 3/mm$^2$, respectively, which film has good runnability and abrasion resistance and provides a magnetic recording medium with good electromagnetic conversion characteristics.

18 Claims, No Drawings

LAMINATED FILM

BACKGROUND OF THE INVENTION

1. Field of the Invention

The present invention relates to a laminated polyester film. More particularly, the present invention relates to a laminated polyester film which has excellent runnability and abrasion resistance and is suitable as a base film of a magnetic recording medium having good electromagnetic conversion characteristics.

2. Description of the Related Art

Recently, a recording density of a magnetic recording medium is remarkably increased and further increase of the recording density is desired. With the increase of recording density, it is necessary to reduce a thickness of a magnetic layer of the magnetic recording medium and therefore surface properties of a polyester base film have large influence on the electromagnetic conversion characteristics of the magnetic recording medium. That is, surface unevenness of the base film is reelected on a surface condition of the magnetic layer. In particular, when coarse protrusions are present on the surface of base film, they will cause drop out. Therefore, the film surface should be made as smooth as possible.

On the other hand, in order to improve runnability of the polyester film during production of the film or a winding property during winding up the film, or to keep good runnability of a magnetic tape in contact to guide pins or a magnetic head, unevenness formed on the film surface so as to impart a slip property to the film.

To achieve the high recording density and high quality of the magnetic recording medium, the film surface should be designed so that the above two contradictory properties, namely the surface smoothness and maintenance of runnability are satisfied simultaneously.

In addition to the above properties, it is highly required to reduce a production cost of the polyester film. To this end, in addition to the increase of productivity and yield, it is important to reduce a cost of a raw material. That is, a self-reclaimed or recycled material or a mass produced raw material which is produced by a continuous polymerization method has been investigated as a raw material of the laminated film.

When a cheap raw material such as a reclaimed material is used, there arise various problems that solid or gel-like foreign materials contained therein form large protrusions which can be a cause of drop out of the magnetic recording medium comprising a base film produced from such material, an intrinsic viscosity is decreased so that the productivity of the film is decreased, or the properties of the film such as abrasion resistance are deteriorated.

Today, since the recording density of the magnetic recording medium is very high, a base film which cannot solve these problems will not be used as the base film of magnetic recording medium.

SUMMARY OF THE INVENTION

An object of the present invention is to provide a laminated polyester film which is suitable as a base film of a magnetic recording medium and can solve the above problems of the conventional polyester films.

According to the present invention, there is provided a laminated polyester film comprising a first polyester layer B and a second polyester layer A which is laminated on at least one surface of said polyester layer B and contains 0.05 to 10% by weight of particles having an average particle size ($d_{50}$) of 0.005 to 1.0 μm based on the weight of said polyester layer A, wherein a ratio of a thickness ($t^A$) of said polyester layer A to a particle size $d_{25}^B$) of particles contained in said polyester layer B ($t^A/d_{25}^B$) is from 0.5 to 10, the numbers of protrusions on a surface of said polyester layer A which give second order interference fringes, third order interference fringes and fourth or higher order interference fringes in a multiple beam interference method using light having a wavelength of 540 nm are from 5 to 60/mm$^2$, not larger than 20/mm$^2$ and not larger than 3/mm$^2$, respectively.

DETAILED DESCRIPTION OF THE INVENTION

The polyester to be used in the present invention is a polyester prepared by polycondensation of an aromatic dicarboxylic acid or its ester such as terephthalic acid and 2,6-naphthalene dicarboxylic acid and an aliphatic glycol such as ethylene glycol, diethylene glycol and 1,4-cyclohexanedimethanol. Typical examples of the polyester are polyethylene terephthalate (PET), polyethylene 2,6-naphthalate (PEN), and the like. The polyester may be a homopolymer or a copolymer comprising 20% or less of a third monomer. As the optional dicarboxylic acid, isophthalic acid, phthalic acid, adipic acid, sebacic acid, oxycarboxylic acids (e.g. p-oxyethoxybenzoic acid, etc.) and mixtures thereof may be used. As the optional glycol, propylene glycol, butanediol, neopentyl glycol and mixtures thereof may be used.

In general, the polyester to be used in the present invention has an intrinsic viscosity of 0.5 to 1.0. While polyesters for the layers A and B may have different intrinsic viscosities, a difference of the intrinsic viscosities is preferably 0.20 or less, more preferably 0.15 or less, in particular 0.10 or less in order to avoid the formation of thickness patterns in each layer or curling of the biaxially oriented film due to the viscosity difference in the melting step.

Other polymer such as polyamide, polyolefin or polycarbonate may be blended in an amount of 10% by weight or less with the polyester. But, it is not preferable to blend a polymer which alters the crystallinity of polyester or blending of which greatly changes the surface shape.

The polyester layers A and B may be prepared from the same polyester or different polyesters. For example, PET and PEN can be combined, or one or both layers are prepared from different copolymers.

The polyester may contain any additive such as a heat stabilizer, a blocking preventing agent, an antioxidant, a colorant, an antistatic agent, a UV light absorber, etc. in addition to a transesterification catalyst and a polymerization catalyst which are used in the preparation of the polyester.

One of the characteristics of the present invention is that the layer A containing the specific particles is laminated on at least One surface of the layer B.

Examples of the particles to be contained in the layer A are kaolin, talc, titanium dioxide, silicon dioxide, calcium carbonate, calcium phosphate, aluminum oxide, zeolite, lithium fluoride, barium sulfate, carbon black and fine particles of a heat resistant polymer which is disclosed in Japanese Patent Publication No. 5216/1984 and Japanese Patent Kokai Publication No. 217755/1984).

In the present invention, the particles to be contained in the layer A has an average particle size ($d_{50}^A$) of 0.005 to 1.0 μm, preferably 0.01 to 1.0 μm, more preferably 0.1 to 0.8 μm. When the average particle size ($d_{50}^A$) is less than 0.005 μm, the runnability of the film is not sufficiently improved. When this average particle size exceeds 1.0 μm, the number of coarse protrusions increases on the surface of the layer A so that the electromagnetic conversion characteristics of the magnetic recording medium are deteriorated unpreferably. A content of such particles is from 0.05 to 10% by weight, preferably from 0.05 to 5% by weight, more preferably from 0.1 to 2% by weight based the weight of the layer A. When the content of the particles is less than 0.05% by weight, the runnability of the film is not sufficiently improved. When the content of the particles exceeds 10% by weight, the particles tend to agglomerate to form large protrusions on the surface of the layer A so that the electromagnetic conversion characteristics of the magnetic recording medium are deteriorated unpreferably, or the particles tend to drop off in the film production step or the magnetic tape production step.

Since high recording density type magnetic recording media such as a metal powder type magnetic recording medium require uniformity of height and distribution of the protrusions, the particles to be contained should have a narrow particle size distribution, Preferably, a particle size distribution value, which is defined below, is 1.90 or less, more preferably 1.60 or less, in particular 1.50 or less:

Particle size distribution value=$d_{25}/d_{75}$ wherein $d_{25}$ is a particle size (μm) of particle which is at the 25% volume base on the total volume of the particles and $d_{75}$ is a particle size (μm) of particle which is at the 75% volume based on the total volume of the particles, when a volume is integrated from the largest particle size to the smallest particle size in an equivalent sphere diameter distribution.

When the particle distribution value exceeds 1.90, some large particles are present so that large protrusions tend to be formed.

When the film of the present invention is subjected to the multiple beam interference method using light having a wavelength of 540 nm, the numbers of protrusions on a surface of the polyester layer A which give second order interference fringes, third order interference fringes and fourth order interference fringes are from 5 to 60 protrusions/mm², not larger than 20 protrusions/mm² and not larger than 3 protrusions/mm², respectively.

As the polyester which forms the layer B of the film according to the present invention, a self-reclaimed or recycled material, or a mass produced raw material which is produced by a continuous polymerization method is preferably used to decrease the production cost of the film, though a new polyester can be used.

The self-reclaimed material herein used is intended to mean a material regenerated from scraps such as cut edges of the film. In the laminated film according to the present invention, the reclaimed material is preferably a mixed reclaimed material of the raw materials for the layers A and B. Since the particles in the layer A have the specific particle size and are contained in a limited amount, they will have no or little influence on the surface smoothness of the layer A when they are contained in the layer B. But, the surface smoothness of the layer A is influenced by the particles contained in the layer B, when the reclaimed material contains particles having a larger particle size than those contained in the layer A or the raw material contains foreign particles or gel-like materials which are generated or included in the production step of reclaimed material or when the removal of foreign particles is insufficient because of the cheap raw material such as the continuously polymerized material.

In the present invention, a ratio of the average particle size of the particles contained in the layer B to the thickness of the layer A is limited in a certain range, whereby the influence of the raw material of the layer B on the surface smoothness of the layer A is suppressed, and the number of coarse protrusions is limited in the range defined by the present invention.

That is, a ratio Of the thickness ($t^A$) of the layer A to the particle size ($d_{25}^B$) of particles contained in the layer B ($t^A/d_{25}^B$) is from 0.5 to 10, preferably from 0.7 to 5.0. When this ratio is smaller than 0.5, the influence of the particles Contained in the layer B on the surface of the layer A increases so that the surface roughness of the layer A increases, the surface of the layer A is waved or the number of coarse protrusions increases. When this ratio exceeds 10, a thickness ratio of the layer B becomes small so that the production cost is not reduced effectively.

The thickness of the layer A ($t^A$) is usually from 0.3 to 6 μm. When the thickness of the layer A is smaller than 0.3 μm, the particles contained in the layer A easily fall off, while when the thickness is larger than 6 μm, the production cost is not reduced effectively. Preferably, the thickness $t^A$ of the layer A is from 0.5 to 5 μm, more preferably from 1 to 4 μm.

In addition to the above conditions, a content of the particles in the layer B is preferably not larger than 2% by weight. When this content exceeds 2% by weight, the particles may tend to agglomerate and have influence on the layer A or a slitting property of the film may be worsened. More preferably, the content of particles in the layer B is 1% by weight or less.

In the laminated film of the present invention, the surface roughness of the film is adjusted by the inclusion of the particles in the layer A. To achieve the good electromagnetic conversion characteristics and runnability of the magnetic recording medium, a center line average surface roughness Ra on the surface of layer A is preferably from 5 to 30 nm and the largest height Rt of the protrusions is preferably from 20 to 400 nm. When either one of Ra and Rt is smaller than the above lower limit, the winding property of the film may be worsened and runnability of the magnetic recording medium may be insufficient. More preferably, Ra is from 5 to 20 nm and Rt is from 20 to 300 nm. The properties of the film and the magnetic recording medium are highly satisfied When a ratio Rt/Ra is 12 or less, preferably 10 or less.

While the layer A can be laminated on one surface of the layer B, the layers A are preferably laminated on the respective surfaces of the layer B when the film is used as the base film of the high density recording type magnetic recording medium.

Since the layer B may possibly contain comparatively large particles, it is not preferable that the surface of the layer B is exposed outside. That is, when the magnetic layer is formed directly on the layer B, the unevenness of the surface of layer B is reflected directly on the magnetic layer surface. When the magnetic layer is formed on the layer A, the unevenness of the layer B is transferred to the magnetic layer surface so that the surface roughness of the magnetic layer is influenced by the surface unevenness of the layer B. In either case, the electromagnetic conversion characteristics are deteriorated. To achieve both good electromagnetic conversion characteristics and good runnability, the layers A are laminated on both surfaces of the layer B to form the exposed surfaces.

When a Young's modulus of the laminated film is at least 450 kg/mm$^2$ in a transverse direction of the film, a sum of Young's moduli in the machine and transverse directions of the film is at least 850 kg/mm$^2$ preferably at least 900 kg/mm$^2$ and elongation at break both in the machine and transverse directions is at least 50%, no or little trouble occurs in the magnetic tape production step, the runnability of the magnetic tape and head touch of the magnetic tape to the VTR head are excellent so that the high-level electromagnetic conversion characteristics are achieved The method for producing the laminated polyester film of the present invention will be explained.

The particles may be added to the polyester of the layer A by any method. For example, the particles are dispersed in ethylene glycol and the like to obtain a slurry and the slurry is added in any step in the preparation of the polyester by polycondensation, or the particles are dispersed in ethylene glycol, water and the like to obtain a slurry and blending the slurry with the polyester raw material in an extruder, or the dried particles are blended with the polyester raw material in an extruder.

Further, as the particles to be contained in the polyester, so-called precipitated particles can be used. The precipitated particles mean fine particles which precipitate in a usual polymerization of polyester using a compound of an alkali metal or alkaline earth metal as a transesterification catalyst. In this case, it is possible to use at least one phosphorus compound such as phosphoric acid, trimethyl phosphate, triethyl phosphate, acid ethyl phosphate, phosphorous acid, triethyl phosphite and the like.

In any case, the precipitated fine particles formed in the course of polyester production contains at least one element such as calcium, lithium, antimony and phosphorus.

Preferably, the precipitated particles and the above particles are used in combination.

The laminated polyester film of the present invention can be produced by a lamination method or a coextrusion method. The coextrusion method is preferred. For example, using two or three extruder or a two or three-layer manifold or feed block, the polyester raw materials for the layers A and B are laminated and a molten sheet is extruded from a two or three-layer orifice, cooled and solidified on a cooling drum to obtain an unoriented sheet. In this case, each of the raw material polyesters for the layers A and B is preferably filtrated through a filter before it is melt laminated. With the polyester for the layer A, a filter having a pore size of 20 $\mu$m or less, preferably 10 $\mu$m or less is used. With the polyester for the layer B, a filter having a pore size of 40 $\mu$m or less, preferably 20 $\mu$m or less is used. As the filter, a wire mesh, a sintered wire mesh, a sintered metal or a non-woven fabric filter made of glass fiber or stainless steel fiber may be used. Among them, the sintered metal or the non-woven fabric filter made of stainless steel fiber is preferred in view of a filtration efficiency of foreign particles. The same or different type filters may be used for filtrating the polyesters for the layers A and B With the polyester for the layer B, preferably two or more filters are used with decreasing the pore sizes of the filters for efficiently removing the foreign particles and prolonging the filter life.

In a cooling and solidifying step of the molten sheet on a cooling roll, to improve the flatness of sheet, adhesion between the sheet and the cooling drum should be high. To this end, the present invention preferably uses electrostatic pinning or liquid coating adhesion.

In the electrostatic pinning, a linear electrode is stretched over the sheet in a direction perpendicular to a flow direction of the sheet, and a direct current of about 5 to 10 kV is applied to the electrode to charge static electricity on the sheet, whereby the adhesion of the sheet to the drum in increased. In the liquid coating adhesion, the whole or a part (e.g. parts contacting to the both edges of sheet) of the peripheral surface of rotating cooling drum is coated with a liquid uniformly, whereby the adhesion of the drum to the sheet is increased. These two methods may be used in combination in the present invention, if desired.

Then, the film is biaxially stretched. Concretely, the unoriented sheet is stretched in one direction with a roll or a tenter at a temperature of 70° to 150° C., preferably 80° to 130° C. at a draw ratio of 3.0 to 7, preferably 3.5 to 6. In the next step, the uniaxially oriented film is stretched in a direction perpendicular to the direction of first orientation at a temperature of 70° to 135° C., preferably 80° to 125° C. at a draw ratio of 3.0 to 7, preferably 3.5 to 6, and heat treated at a temperature of 170° to 250° C. at a constant length or with a limited relaxation or elongation of 30% or less to obtain a biaxially oriented film.

The orientation in one direction can be carried out in two or more steps. In this case, the total draw ratio is preferably in the above range.

Alternatively, the sheet can be biaxially stretched simultaneously with an area ratio of 10 to 40 times. If necessary, before or after heat treatment, the oriented film may be reoriented in a machine and/or transverse directions.

The polyester film of the present invention is suitably used as a base film of a magnetic recording medium having good electromagnetic conversion characteristics and runnability. The polyester film of the present invention can cope with the requirement for cost reduction by reducing the cost of raw materials without deteriorating the quality of the film.

PREFERRED EMBODIMENTS OF THE INVENTION

The present invention will be illustrated by the following Examples, which do not limit the scope of the present invention. In Examples, "parts" and "%" are by weight.

In Examples, the properties and characteristics are measured or evaluated as follows:

(1) Average particle size and particle size distribution value

The particle size is measured by a sedimentation method based on the Stokes' Law using a centrifugal sedimentation type particle size distribution measuring apparatus SA-CP 3 (manufactured by Shimadzu Corporation) and converted to an equivalent sphere diameter.

The particle size at 50% of the integrated volume is used as an average particle size ($d_{50}$).

The particle size distribution value is expressed by a ratio of $d_{25}/d_{75}$ wherein $d_{25}$ is a particle size of particle which is at the 25% volume based on the total volume of the particles and $d_{75}$ is a particle size of particle which is at the 75% volume when a volume is integrated from the largest particle size to the smallest particle size. As this value approaches 1 (one), the particle size distribution is narrow.

(2) Number of coarse protrusions

Aluminum is vacuum deposited on the film surface and the film surface is observed with a multiple beam interference microscope. The numbers of the protrusions which provide the second, third and fourth or higher order interference fringes are counted and converted to the numbers per unit area ($mm^2$).

(3) Thickness of a layer A

The thickness of layer A is measured by observing a cross section of the film with a transmission electron ultra-microscope. That is, a small piece of film sample is embedded in a hardened resin composition comprising an epoxy resin, a hardener and an accelerator, and cut out with a microtome to obtain an observation sample having a thickness of about 200 nm. A microphotograph of the sample is taken using a transmission electron microscope (H-900 manufactured by Hitachi Limited) and a thickness of layer A containing the particles is measured. The acceleration voltage of the electron microscope is 300 kV, and a magnification is adjusted at 10,000 to 100,000 according to the thickness of layer A.

The thickness of layer A is measured at 50 points and 10 thicknesses from the largest one and 10 thicknesses from the smallest one are neglected and the 30 thicknesses are averaged.

(4) Surface roughness of a film

Center line average surface roughness (Ra):

Using a surface roughness tester (SE-3F manufactured by Kosaka Kenkyusho, Ltd.), the center line average surface roughness Ra is measured according to JIS B-0601-1976, with necessary modification. The measuring conditions include the use of a contact needle having a tip radius of 2 μm, 30 mg of probe contact pressure, 0.08 mm of cutoff, and 2.5 mm of a measuring length. The measurement is performed at 10 points on the film and the measured values are averaged.

Largest protrusion height Rt:

From a cross sectional curve obtained with the above surface roughness tester (SE-3F), a part along 2.5 mm of a base line is selected (selected part), and sandwiched with a pair of parallel lines. A distance between the parallel lines is measured in the vertical direction of the selected part and expressed in a unit of "μm", which is used as the largest height of the removed part. The measuring conditions include the use of a contact needle having a tip radius of 2 μm, 30 mg of probe contact pressure and 0.08 mm of cutoff. The measurement is performed with ten selected parts and the measured values are averaged. As the Rt/Ra ratio is smaller, the protrusions are uniform.

(5) Characteristics of a video tape

A video tape is produced as follows:

Magnetic fine powder (200 parts), a polyurethane resin (30 parts), nitrocellulose (10 parts), a vinyl chloride/vinyl acetate copolymer (10 parts), lecitin (10 parts), cyclohexanone (100 parts), methyl isobutyl ketone (100 parts) and methyl ethyl ketone (300 parts) are mixed and dispersed in a ball mill for 48 hours, followed by the addition of a polyisocyanate compound (5 parts) to obtain a magnetic paint.

The magnetic paint is coated with a gravure roll on a surface of a polyester film opposite to the layer A to a dry thickness of 3 μm, magnetically orientated before it is sufficiently dried, and then dried. The coated film is subjected to super calendering and slit at a width of ½ inch to obtain a video tape.

The characteristics of the video tape are evaluated using a NV-3700 video deck (manufactured by Matsushita Electric Industrial Co., Ltd.) at a normal speed.

VTR head output:

A VTR head output at a measuring frequency of 4 MHz is measured using a synchroscope. The measured value is expressed as a relative value (dB) to a value of a standard tape (0 dB).

Number of dropouts:

The number of dropouts at 15 μsec.−20 dB is counted using a dropout counter made by Ohkura Industries, Co., Ltd., and the counted number is converted to the number of dropouts per one minute.

Tape runnability:

A running condition in the video deck is observed with naked eyes and evaluated.

EXAMPLE 1

In a reactor, dimethyl terephthalate (100 parts), ethylene glycol (60 parts), magnesium acetate tetrahydrate (0.09 part) were charged and heated while removing methanol to effect transesterification, in which a temperature of the mixture was raised up to 230° C. in 4 hours from the start of reaction to substantially complete the transesterification.

A slurry of synthetic calcium carbonate particles having an average particle size of 0.27 μm and a particle size distribution value of 1.35 (1.0 parts) in ethylene glycol was added to the above reaction mixture. Further, acid ethyl phosphate (0.04 part) and antimony trioxide (0.04 part) were added and a polycondensation reaction was carried out for 4 hours to obtain the polyethylene terephthalate A.

The polyethylene terephthalate A had an intrinsic viscosity of 0.65. The observation of the film inside with a microscope confirmed that the particles were uniformly dispersed.

By continuously polymerizing terephthalic acid and ethylene glycol, polyethylene terephthalate B containing no particle and having an intrinsic viscosity of 0.68 was prepared.

Separately, a reclaimed polyester C which was obtained in the production of a film used in other application was provided. The polyester C contained calcium carbonate particles and silica particles and had the intrinsic viscosity of 0.58.

Each 50 parts of the polyesters B and C were comminuted and mixed to obtain the polyester D, in which the particles had $d_{50}$ of 0.7 μm and $d_{25}$ of 1.1 μm. The content of whole particles was 0.07%.

The polyethyleneterephthalate A and the polyester D were dried separately and melt extruded from respective extruders at 290° C. and extrudates were combined and laminated through a feed block. Before passing the polymers through the feed block, the polyethylene terephthalate A was filtrated through the non-Woven fabric filter having a pore size of 10 μm, and the polyester D was filtrated through the non-woven fabric filter having a pore size of 20 μm to remove the foreign particles. The film was cooled and solidified on a cooling roll kept at a surface temperature of 40° C. with applying the electrostatic pinning to obtain an unoriented laminated film.

The laminated film was stretched in a machine direction at a draw ratio of 3.7 at 85° C. and then stretched with a tenter in a transverse direction at a draw ratio of 3.8 at 100° C. Further, the oriented film was restretched in the machine direction at a draw ratio of 1.13 and heat set at 220° C. to obtain a biaxially oriented laminated film having a thickness of 15 μm.

The film had the three layer structure of A/B/A consisting of the outer layers A made of the polyethylene terephthalate A and the inner layer B made of the polyester D having thicknesses of 2 μm/11 μm/2 μm.

EXAMPLE 2

Scraps (e.g. cut edges) obtained in the production of film in Example 1 were melt extruded to form pellets and produce the self-reclaimed polyester E having an intrinsic viscosity of 0.57.

The self-reclaimed polyester E (50 parts), the polyester B prepared in Example 1 (25 parts) and the polyester C (25 parts) were mixed to obtain the polyester F for the layer B, in which the particles had $d_{25}^B$ of 0.95 μm and the content of particles was 0.35%.

Using the polyethylene terephthalate A for the layers A and the polyester F for the layer B, the laminated film having the A/B/A structure was produced in the same manner as in Example 1. The thicknesses were 1.5 μm/12 μm/1.5 μm.

Comparative Example 1

In this Example, a reclaimed polyester G containing 0.15% of silica particles was used as a raw material for the layer B. The polyester G had an intrinsic viscosity of 0.57, and the contained silica particles had a broad particle size distribution and $d_{25}$ was 2.0 μm.

Using the polyethylene terephthalate A for the layers A and the polyester G for the layer B, the laminated film having the A/B/A structure was produced in the same manner as in Example 1. The thicknesses were 0.7 μm/13.5 μm/0.7 μm.

Comparative Example 2

A polyester A' containing 2% of synthetic calcium carbonate having the same particle size as that of the particles contained in the polyethylene terephthalate A (30 parts), the polyethylene terephthalate B (30 parts) and the polyester C (40 parts) were mixed and molded under the same conditions as in Example 1 to obtain a single layer film having a thickness of 15 μm.

Example 3

As a raw material for the layer A, was prepared polyethylene terephthalate H which contained 0.8% of spherical particles of a crosslinked polymer having an average particle size of 0.3 μm and 0.5% of delta-aluminum oxide having a primary particle size of 0.03 μm and had an intrinsic viscosity of 0.67.

As a raw material for the layer B, the polyester J was prepared by mixing the reclaimed polyester I containing silica particles and kaolin and having an intrinsic viscosity of 0.58 and the polyester B used in Example 1 in a weight ratio of 60:.40. The content of particles in the polyester J was 0.1% and $d_{25}$ was 1.1 μm.

Using the above polyesters, an unoriented laminated sheet was prepared in the same manner as in Example 1. The laminated film was stretched in a machine direction at a draw ratio of 2.4 at 83° C. and further at a draw ratio of 1.2 at 90° C. and then stretched with a tenter in a transverse direction at a draw ratio of 4.0 at 120° C. Thereafter, the oriented film was heat set at 230° C. to obtain a biaxially oriented laminated film having a thickness of 15 μm.

The film had the three layer structure of A/B/A having thicknesses of 2 μm/11 μm/2 μm.

Comparative Example 3

In the same manner as in Example 3 except that, as a polyester for the layer A, polyester containing 0.03% of silica particles having an average particle size of 1.4 μm, a laminated film having a thickness of 15 μm was produced.

The properties of the films produced in Examples and Comparative Examples and the characteristics of the magnetic tape are shown in the following Table.

TABLE

| Example No. | Particles in Layer A Kind | $d_{50}$ (μm) | $d_{25}/d_{75}$ | Thickness of Layer A $t^A$ (μm) | Particle size of particles in Layer B $d_{25}^B$ (μm) | $t^A/d_{25}^B$ | Surface roughness of exposed surface of Layer A Ra (nm) | Rt (nm) | Rt/Ra | Number of coarse protrusions by multiple beam interfering method (protrusions/mm²) 2nd order | 3rd order | 4th or higher order | Characteristics of magnetic tape SIN (dB) | No. of drop outs (No./min.) | Runnability |
|---|---|---|---|---|---|---|---|---|---|---|---|---|---|---|---|
| 1 | Syn. CaCO₃ | 0.27 | 1.50 | 2 | 1.1 | 1.82 | 12 | 120 | 10 | 10 | 1 | 1 | +1.0 | 0.4 | Good |
| 2 | ↑ | 0.27 | 1.50 | 1.5 | 0.95 | 1.58 | 13 | 125 | 9.6 | 8 | 1 | 0 | +1.1 | 0.3 | ↑ |
| 3 | Spherical polymer particle | 0.30 | 1.25 | 2 | 1.1 | 1.82 | 15 | 165 | 11 | 15 | 5 | 1 | +0.9 | 0.2 | ↑ |
|   | Alumina | 0.03 |   |   |   |   |   |   |   |   |   |   |   |   |   |
| C. 1 | Syn. CaCO₃ | 0.27 | 1.50 | 0.7 | 2.0 | 0.35 | 20 | 360 | 18 | 40 | 17 | 4 | −0.5 | 10 | ↑ |
| C. 2 | (Single Layer Film) |   |   |   |   |   | 25 | 420 | 17 | 63 | 15 | 9 | −1.0 | 25 | ↑ |
| C. 3 | Silica | 1.4 | 2.0 | 2 | 1.1 | 1.82 | 10 | 200 | 20 | 60 | 12 | 11 | −1.4 | 4 | Poor |

What is claimed is:

1. A laminated polyester film comprising:
   a) a first polyester layer B comprising particles of particle size $d_{25}^B$, and
   b) a second polyester layer A formed on a surface of layer B, wherein layer A has a thickness ($t^4$) and comprises 0.05 to 10% by weight based on the weight of said layer A of particles having an average particle size ($d_{50}^4$) of 0.005 to 1.0 micrometers, wherein the ratio of $t^4$ to $d_{25}^B$ is from 0.5 to 10, and wherein the surface of layer A furthest from layer B has protrusions such that the number protrusions which give second order interferences fringes, the number of protrusions which give third order interference fringes, and the number of protrusions which give fourth or higher order interference fringes in a multiple beam interference method using light having a wavelength of 540 nm are from 5 to 60/mm², not larger than 20/mm², and not larger than 3/mm², respectively.

2. The laminated polyester film according to claim 1, wherein the difference of intrinsic viscosities between the polyester of said layer A and that for said layer B is 0.20 or less.

3. The laminated polyester film according to claim 1 wherein said average particle size $d_{50}^A$ of the particles contained in said layer A is from 0.01 to 1.0 μm.

4. The laminated polyester film according to claim 1, wherein the content of the particles in said layer A is from 0.05 to 5% by weight.

5. The laminated polyester film according to claim 1, wherein said ratio $t^A/d_{25}^B$ is from 0.7 to 5.0.

6. The laminated polyester film according to claim 1, wherein said layer A has a thickness of 0.3 to 6 μm.

7. The laminated polyester film according to claim 1, wherein the surface of said layer A furthest from layer B has a center line average surface roughness Ra of 5 to 30 nm.

8. The laminated polyester film according to claim 1, wherein, on the surface of said layer A furthest from layer B, the largest height of protrusions Rt is from 20 to 400 nm.

9. The laminated polyester film according to claim 1, wherein on the surface of said layer A furthest from layer B, the ratio of the largest height of protrusions to a center line average surface roughness (Rt/Ra) is 12 or less.

10. A magnetic recording medium comprising a laminated polyester film according to claim 1 and a magnetic layer.

11. A laminated polyester film according to claim 1, wherein layers A and B independently comprise one or more of polyethylene terephthalate or polyethylene 2,6-naphthalate.

12. A laminated polyester film according to claim 1, wherein the particles in layer A have a particle size distribution value ($d_{25}/d_{75}$) of less than 1.90.

13. A laminated polyester film according to claim 1, wherein layer B comprises a reclaimed or recycled polyester.

14. A laminated polyester film according to claim 1, wherein layer B comprises a mixed polyester reclaimed from the raw material for layers A and B.

15. A laminated polyester film according to claim 1, wherein layer B comprises up to 2% by weight of particles.

16. A laminated polyester film according to claim cm 1, which comprises a layer A on both sides of layer B.

17. A laminated polyester film according to claim 1, wherein the Young's modulus of the laminated film is at least 450 kg/mm² in the transfer direction, the sum of Young's moduli in the machine and transverse directions of the laminated film is at least 850 kg/mm² and the elongation at break in both the machine and transverse direction is at least 50%.

18. A process for producing a laminated polyester film according to claim 1 comprising the steps of:
    a) coextruding the materials for the individual layer A and B, to obtain an unoriented sheet, and
    b) biaxially stretching the unoriented sheet.

* * * * *